United States Patent
Sasaki et al.

(10) Patent No.: US 10,833,359 B2
(45) Date of Patent: Nov. 10, 2020

(54) SOLID ELECTROLYTE MATERIAL INCLUDING SULFIDE LAYER AND OXIDE LAYER, AND BATTERY INCORPORATING THE SOLID ELECTROLYTE MATERIAL

(71) Applicant: Panasonic Intellectual Property Management Co., Ltd., Osaka (JP)

(72) Inventors: Izuru Sasaki, Kyoto (JP); Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 123 days.

(21) Appl. No.: 16/055,155

(22) Filed: Aug. 6, 2018

(65) Prior Publication Data

US 2019/0081352 A1   Mar. 14, 2019

(30) Foreign Application Priority Data

Sep. 8, 2017 (JP) .................... 2017-172876

(51) Int. Cl.
*H01M 10/0562* (2010.01)
*H01M 10/052* (2010.01)
(Continued)

(52) U.S. Cl.
CPC ........ *H01M 10/0562* (2013.01); *H01B 1/122* (2013.01); *H01M 4/131* (2013.01); *H01M 4/366* (2013.01); *H01M 4/625* (2013.01); *H01M 10/052* (2013.01); *H01M 2300/0068* (2013.01); *H01M 2300/0094* (2013.01)

(58) Field of Classification Search
None
See application file for complete search history.

(56) References Cited

U.S. PATENT DOCUMENTS

2012/0043942 A1* 2/2012 Tamane ................ H01M 4/38
320/136
2013/0177821 A1   7/2013 Tsuchida et al.
(Continued)

FOREIGN PATENT DOCUMENTS

| JP | 2012-048971 | 3/2012 |
|---|---|---|
| JP | 2012-094445 | 5/2012 |

(Continued)

OTHER PUBLICATIONS

JP 2012-094445 English translation. Tsuchida et al. Japan. May 17, 2012. (Year: 2012).*

*Primary Examiner* — Christopher P Domone
(74) *Attorney, Agent, or Firm* — McDermott Will & Emery LLP (57) ABSTRACT

A sulfide solid electrolyte material includes a sulfide layer and an oxide layer disposed on the sulfide layer. The sulfide layer contains a sulfide that contains lithium, phosphorus, a halogen, and sulfur. The oxide layer contains an oxide that contains lithium, phosphorus, a halogen, and oxygen. In a $^{31}$P-NMR spectrum of the sulfide solid electrolyte material, a first peak component, which is defined within a first chemical shift range from 87.6 to 88.4 ppm, has an intensity equal to or less than 0.42 times that of a second peak component, which is defined within a second chemical shift range from 83.6 to 84.4 ppm.

10 Claims, 3 Drawing Sheets

(51) Int. Cl.
  *H01M 4/131*  (2010.01)
  *H01M 4/36*   (2006.01)
  *H01M 4/62*   (2006.01)
  *H01B 1/12*   (2006.01)

(56) References Cited

U.S. PATENT DOCUMENTS

| | | | |
|---|---|---|---|
| 2014/0127588 A1 | 5/2014 | Kato et al. | |
| 2014/0287324 A1* | 9/2014 | Tsuchida | H01M 10/0562 |
| | | | 429/304 |
| 2014/0302382 A1 | 10/2014 | Kambara et al. | |
| 2014/0315103 A1 | 10/2014 | Higuchi | |
| 2016/0133989 A1* | 5/2016 | Suzuki | H01M 10/0562 |
| | | | 429/323 |
| 2016/0322666 A1* | 11/2016 | Kim | H01M 10/0562 |
| 2017/0352916 A1 | 12/2017 | Miyashita et al. | |

FOREIGN PATENT DOCUMENTS

| | | |
|---|---|---|
| JP | 2013-201110 A | 10/2013 |
| JP | 2014-093263 A | 5/2014 |
| JP | 2015-153628 | 8/2015 |
| WO | 2012/164724 | 12/2012 |
| WO | 2013/080553 | 6/2013 |
| WO | 2016/104702 | 6/2016 |

\* cited by examiner

SOLID ELECTROLYTE MATERIAL INCLUDING SULFIDE LAYER AND OXIDE LAYER, AND BATTERY INCORPORATING THE SOLID ELECTROLYTE MATERIAL

BACKGROUND

1. Technical Field

The present disclosure relates to a sulfide solid electrolyte material and a battery incorporating it.

2. Description of the Related Art

A lithium secondary battery has a cathode, an anode, and an electrolyte layer disposed therebetween. The electrolyte layer contains a non-aqueous liquid or solid electrolyte. Since commonly used liquid electrolytes are inflammable, a lithium secondary battery incorporating a liquid electrolyte requires a system that ensures safety. Solid electrolytes are nonflammable and therefore only need to have a simple safety system. A battery incorporating a solid electrolyte is referred to as an all-solid-state battery.

Solid electrolytes are roughly divided into organic and inorganic ones. The former is also called polymer solid electrolytes. Because of the ionic conductivity of approximately $10^{-6}$ S/cm of an organic solid electrolyte at room temperature, an all-solid-state battery incorporating an organic solid electrolyte is difficult to operate at room temperature. The latter includes oxide and sulfide solid electrolytes.

International Publication No. 2016/104702 discloses a sulfide-based solid electrolyte for lithium ion cells that is cubic argyrodite in crystallographic structure. Japanese Unexamined Patent Application Publication No. 2012-94445 discloses a sulfide solid electrolyte particle that has an oxide layer resulting from the oxidation of the surface of the particle itself.

SUMMARY

In one general aspect, the techniques disclosed here feature a sulfide solid electrolyte material. The sulfide solid electrolyte material includes a sulfide layer containing a sulfide that contains lithium, phosphorus, a halogen, and sulfur, and an oxide layer on the sulfide layer, the oxide layer containing an oxide that contains lithium, phosphorus, the halogen, and oxygen. In a $^{31}$P-NMR spectrum of the sulfide solid electrolyte material, a first peak component, which is defined within a first chemical shift range from 87.6 to 88.4 ppm, has an intensity equal to or less than 0.42 times that of a second peak component, which is defined within a second chemical shift range from 83.6 to 84.4 ppm.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

A disadvantage of typical sulfide solid electrolyte materials is that they produce hazardous hydrogen sulfide gas. International Publication No. 2016/104702 discloses a sulfide solid electrolyte material that is cubic argyrodite in crystallographic structure and produces less hydrogen sulfide by virtue of containing appropriate elements in an appropriate chemical composition. Japanese Unexamined Patent Application Publication No. 2012-94445 discloses a sulfide solid electrolyte material particle with limited formation of a high-resistance layer upon reaction with an oxide active material. In these publications, however, the relationship is unclear between an oxide layer on the sulfide solid electrolyte material and hydrogen sulfide production.

In general, sulfide materials have high ionic conductivity and produce much hydrogen sulfide. Oxide materials have low ionic conductivity and produce little hydrogen sulfide. When a layer of an oxide material exists confined to the superficial portion of the sulfide solid electrolyte material, where the electrolyte material comes into direct contact with moisture, the oxide layer prevents moisture from reaching the sulfide layer. Such an oxide layer, therefore, can reduce the hydrogen sulfide production of the electrolyte material while leaving its ionic conductivity high.

A sulfide solid electrolyte material according to a first aspect of the present disclosure includes a sulfide layer containing a sulfide material and an oxide layer containing an oxide of the sulfide material. The oxide layer is on the surface of the sulfide layer. The sulfide material contains Li, P, S, and a halogen X as its constituents. In a $^{31}$P-NMR spectrum, the intensity Za of a first peak component, defined as a peak component near 88 ppm, and the intensity Zb of a second peak component, defined as a peak component near 84 ppm, satisfy Za/Zb≤0.42.

According to the first aspect, a sulfide solid electrolyte material is provided that produces little hydrogen sulfide.

In a second aspect of the present disclosure, the halogen X in the sulfide solid electrolyte material according to the first aspect, for example, is I. According to the second aspect, the ionic conductivity of the electrolyte material is higher, and the hydrogen sulfide production may be more sufficiently low.

In a third aspect of the present disclosure, the sulfide material in the sulfide solid electrolyte material according to the first or second aspect, for example, contains Li$_2$S—P$_2$S$_5$—LiX. Li$_2$S—P$_2$S$_5$—LiX contained in the sulfide layer as the sulfide material makes good discharge characteristics of the battery even better.

In a fourth aspect of the present disclosure, the sulfide material in the sulfide solid electrolyte according to any one of the first to third aspects, for example, contains Li$_2$S—P$_2$S$_5$—LiI. According to the fourth aspect, the ionic conductivity of the electrolyte material is higher, and the hydrogen sulfide production may be more sufficiently low.

A battery according to a fifth aspect of the present disclosure includes a cathode, an anode, and an electrolyte layer between the cathode and the anode. At least one selected from the group consisting of the cathode, anode, and electrolyte layer contains a sulfide solid electrolyte material according to any one of the first to fourth aspects.

According to the fifth aspect, a battery is provided that has good output characteristics and produces little hydrogen sulfide.

The following describes embodiments of the present disclosure with reference to the drawings. The present disclosure is not limited to these embodiments.

Embodiment 1

Figure 1:
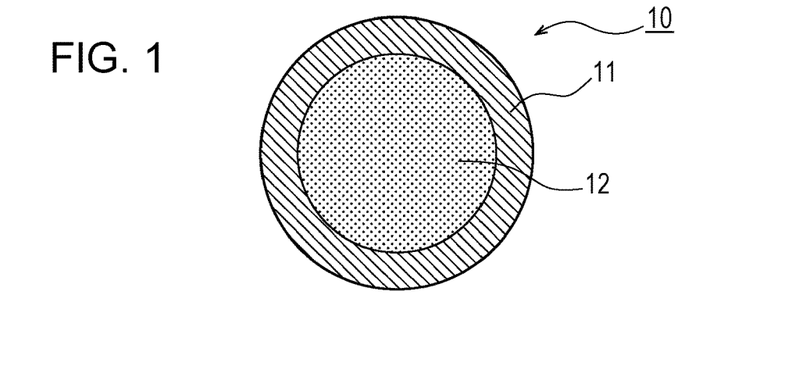
FIG. 1 is a schematic cross-sectional view of a sulfide solid electrolyte material according to Embodiment 1.

As illustrated in FIG. 1, a sulfide solid electrolyte material 10 according to this embodiment includes an oxide layer 11 and a sulfide layer 12. The sulfide layer 12 contains a sulfide material, and the oxide layer 11 contains an oxide of the sulfide material contained in the sulfide layer 12. The oxide layer 11 is on the surface of the sulfide layer 12. In this embodiment, the sulfide solid electrolyte material 10 has a core-shell structure. The sulfide layer 12 is the core, and the oxide layer 11 is the shell. "Sulfide solid electrolyte material 10" hereinafter may be shortened to "electrolyte material 10."

The sulfide material contains Li, P, S, and a halogen X as its constituents. In a $^{31}$P-NMR spectrum of the electrolyte material 10, a peak component near 88 ppm is defined as a first peak component, and a peak component near 84 ppm as a second peak component. The first peak component has an intensity of Za, and the second peak component an intensity of Zb. The ratio of the intensity Za of the first peak component to the intensity Zb of the second peak component (Za/Zb) is 0.42 or less. By virtue of such a structure, the electrolyte material 10 produces little hydrogen sulfide.

The term "peak component" as mentioned herein is not limited to a peak visible in the spectrum but encompasses a latent peak component identified by multi-Gaussian fitting. Expressions like "a peak component which is defined within a chemical shift range from A to B" as used herein mean that the apex of the peak component is within the range where the chemical shift is A or more and B or less. The width of the peak may be broader or narrower than the range width from A to B.

A sulfide solid electrolyte material containing Li, P, and S as its constituents has high ionic conductivity. Adding X (halogen) as another constituent makes the ionic conductivity of the sulfide solid electrolyte material even higher.

Sulfide solid electrolyte materials containing Li, P, S, and X as their constituents can have a variety of structures. The structure determines the ionic conductivity and hydrogen sulfide production of the sulfide solid electrolyte material.

For example, when a sulfide solid electrolyte material contains Li, P, S, and X as its constituents and its structure exhibits a peak near 84 ppm in a $^{31}$P-NMR spectrum of the material, the material is high in ionic conductivity and low in hydrogen sulfide production.

To take another example, when a sulfide solid electrolyte material contains Li, P, S, and X as its constituents and its structure exhibits a peak near 88 ppm in a $^{31}$P-NMR spectrum of the material, the material is low in ionic conductivity and high in hydrogen sulfide production.

A sulfide solid electrolyte material having a sulfide layer and an oxide layer can combine high ionic conductivity and low hydrogen sulfide production because the oxide layer prevents direct contact of the sulfide layer with moisture. However, when a structure that exhibits a peak near 88 ppm is predominant in a sulfide solid electrolyte material, it is difficult to reduce the production of hydrogen sulfide to a sufficiently low level with the oxide layer alone.

In a $^{31}$P-NMR spectrum of a sulfide solid electrolyte material, a peak component near 88 ppm is defined as a first peak component, and a peak component near 84 ppm as a second peak component. The first peak component has an intensity of Za, and the second peak component an intensity of Zb. When the ratio of the intensity Za of the first peak component to the intensity Zb of the second peak component (Za/Zb) is 0.42 or less, the hydrogen sulfide production of the material can be reduced sufficiently.

In $^{31}$P-NMR, ammonium phosphate can be used as the chemical shift reference at 0 ppm. Since the state of the magnetic field is not exactly identical between runs, NMR suffers from measurement errors in the output chemical shift. The measurement error is, for example, ±0.4 ppm. The terms "near 88 ppm" and "near 84 ppm" used herein refer to "88±0.4 ppm" and "84±0.4 ppm," respectively.

The halogen X contained in the electrolyte material 10 according to this embodiment can be I (iodine). This gives the electrolyte material 10 higher ionic conductivity and can make its hydrogen sulfide production more sufficiently low.

The sulfide material in the sulfide layer 12 can be $Li_2S$—$P_2S_5$—LiX. Highly electrochemically stable and highly conductive to ions, $Li_2S$—$P_2S_5$—LiX makes good discharge characteristics of the battery even better when contained in the sulfide layer 12 of the electrolyte material 10. $Li_2S$—$P_2S_5$—LiX can be the primary component of the sulfide layer 12. The term "primary component" refers to the component that is present in the largest amount on a mass fraction basis. Examples of $Li_2S$—$P_2S_5$—LiX that can be used include $Li_6PS_5F$, $Li_6PS_5Cl$, $Li_6PS_5Br$, $Li_6PS_5I$, $Li_7P_2S_8F$, $Li_7P_2S_8Cl$, $Li_7P_2S_8Br$, $Li_7P_2S_8I$, $\alpha Li_2S$-$\beta P_2S_5$-$(100-\alpha-\beta)$LiF, $\alpha Li_2S$-$\beta P_2S_5$-$(100-\alpha-\beta)$LiCl, $\alpha Li_2S$-$\beta P_2S_5$-$(100-\alpha-\beta)$LiBr, and $\alpha Li2S$-$\beta P_2S_5$-$(100-\alpha-\beta)$LiI ($\alpha$ and $\beta$ are numbers greater than 0). The sulfide material can be crystalline or vitreous. When the halogen X is I (iodine), the sulfide material in the sulfide layer 12 can be $Li_2S$—$P_2S_5$—LiI. This gives the electrolyte material 10 higher ionic conductivity and can make its hydrogen sulfide production more sufficiently low.

The oxide layer 11 can be a layer resulting from the oxidation of the sulfide material contained in the sulfide layer 12. For example, when the sulfide layer 12 contains $Li_2S$—$P_2S_5$—LiX (X: a halogen) as the sulfide material, the oxide layer 11 contains an oxide resulting from the oxidation of $Li_2S$—$P_2S_5$—LiX. The term "oxidation of the sulfide material contained in the sulfide layer 12" refers to the substitution of one or more or all sulfur bonds in the sulfide material contained in the sulfide layer 12 with oxygen bonds. To take a sulfide layer 12 in which the sulfide material is $Li_2S$—$P_2S_5$—LiX as an example, the sulfur bonds in the sulfide material are primarily those in the structure of $PS_4^{3-}$, one phosphorus atom bonded with four sulfur atoms. The oxide in the oxide layer 11 in this case contains at least one of the structures resulting from the substitution of one or more or all sulfur bonds in $PS_4^{3-}$, including $PS_3O^{3-}$, $PS_2O_2^{3-}$, $PSO_3^{3-}$, and $PO_4^{3-}$.

A method that can be used to confirm that the electrolyte material 10 has the oxide layer 11 is $^{31}$P-NMR. For example, peaks for the structures of $PS_2O_2^{3-}$, $PSO_3^{3-}$, and $PO_4^{3-}$ contained in the oxide layer 11 appear near 70 ppm, 38 ppm, and 10 ppm, respectively.

The presence of the oxide layer 11 on the surface of the sulfide layer 12 can be verified using ion sputter etching in combination with XPS. When an oxide layer 11 is present, the spectrum has a sharp peak assigned to the O1s orbital. Examples of sputtering ions include the argon ion and the C60 cluster ion. When the oxide layer 11 is on the surface of the sulfide layer 12, the oxygen content gradually decreases from the surface (e.g., the surface of particles) to the inside of the electrolyte material 10.

When the oxide layer is dispersed uniformly, the oxygen content is constant across the sulfide solid electrolyte material from the surface (e.g., the surface of particles) to the inside. In this case, it is difficult to reduce the production of hydrogen sulfide to a sufficiently low level because the sulfide layer is exposed on the surface of the sulfide solid electrode and, therefore, cannot be completely prevented from contact with moisture.

The shape of the electrolyte material 10 is not critical. For example, the electrolyte material 10 is in the shape of needles, flakes, spheres, or ellipsoids. The electrolyte material 10 can be particles. When the electrolyte material 10 is particles (e.g., in the shape of spheres), the median diameter (d50) of the electrolyte material 10 can be 0.1 μm or more and 100 μm or less. In an appropriately sized electrolyte material 10, the proportion (e.g., volume faction) of the oxide layer 11 to the electrolyte material 10 is also appropriate, ensuring sufficient ionic conductivity. In the cathode or anode, moreover, an appropriately sized electrolyte material 10 is dispersed well together with other materials, such as the active material and a conductive additive. These help improve the discharge characteristics of the battery.

The median diameter of the electrolyte material 10 may be 0.5 μm or more and 10 μm or less. Such an arrangement makes the ionic conductivity of the electrolyte material 10 even higher and can lead to better dispersion of the electrolyte material 10 with other materials, such as an active material.

The median diameter of the electrolyte material 10 may be smaller than that of the particles of the active material. This leads to better dispersion of the electrolyte material 10 and other materials, such as the active material.

In the present disclosure, the median diameter of particles refers to the particle diameter at which the cumulative volume of the particles in their particle size distribution, for example measured using a laser diffraction particle size analyzer, is 50% (d50).

When the electrolyte material 10 is particles (e.g., spheres), the thickness of the oxide layer 11 is, for example, 1 nm or more and 300 nm or less and can be 5 nm or more and 50 nm or less. When the oxide layer 11 has such a thickness, the proportion of the oxide layer 11 to the electrolyte material 10 is appropriate, ensuring sufficient ionic conductivity.

The thickness of the oxide layer 11 can be determined by XPS. The oxygen/sulfur ratio (ratio of the number of oxygen atoms to the number of sulfur atoms) on the outermost surface of the electrolyte material 10 is defined as "x," and the oxygen/sulfur ratio in the sulfide layer 12 as "z." Ion sputtering and XPS are alternated to obtain XPS spectra at regular intervals (e.g., at 10-nm intervals). The oxygen/sulfur ratio is determined at each depth to find a depth at which the oxygen/sulfur ratio is roughly equal to (x-z)/4, which can be considered as the thickness of the oxide layer 11. The oxygen/sulfur ratio "z" in the sulfide layer 12 can also be determined by XPS. For example, ion sputtering continued for a sufficiently long time results in the oxygen/sulfur ratio approaching a certain value asymptotically. This asymptotic value can be considered as the ratio "z."

The oxide layer 11 may cover part of the surface or the entire surface of the sulfide layer 12.

An electrolyte material 10 can be produced by the following method.

Precursor materials containing, for example, Li, P, S, X (halogen), $Li_2S$, $P_2S_5$, and LiX are reacted by mechanochemical milling, melt extraction, or any other method. This gives a vitreous sulfide solid electrolyte material.

Heating the resulting vitreous sulfide solid electrolyte material gives a glass-ceramic sulfide solid electrolyte material. The heating temperature can be lower than 280° C. and may be approximately 230° C. Heating temperatures lower than 280° C. will control the precipitation of the crystal phase that gives a peak near 88 ppm in a $^{31}$P-NMR spectrum, thereby limiting the associated decrease in ionic conductivity and increase in hydrogen sulfide production. Heating temperatures around 230° C. will control the precipitation of the crystal phase that gives a peak near 88 ppm while allowing the crystal phase that gives a peak near 84 ppm to separate out, thereby improving the ionic conductivity and reducing the hydrogen sulfide production of the electrolyte material. The duration of heating is between 0.1 and 12 hours for example, and may be between 0.5 and 4 hours.

The glass-ceramic sulfide solid electrolyte material is then placed in an electric furnace set to the desired oxygen partial pressure. Heating the glass-ceramic sulfide solid electrolyte material makes the sulfide solid electrolyte material react with oxygen, oxidizing the electrolyte material. The heating temperature can be lower than 230° C. and may be approximately 210° C. Heating temperatures lower than 230° C. will control the precipitation of the crystal phase that gives a peak near 88 ppm in a $^{31}$P-NMR spectrum, thereby limiting the associated decrease in ionic conductivity and increase in hydrogen sulfide production. The crystal phase that gives a peak near 88 ppm usually forms at temperatures of 280° C. and above. During this process of oxidation, the sulfide solid electrolyte material self-heats while reacting with oxygen. The resulting local heating of the sulfide solid electrolyte material to temperatures of 280° C. and above can cause the precipitation of the crystal phase that gives a peak near 88 ppm, and this is the reason why the heating temperature for the oxidation can be lower than 230° C. Heating temperatures around 210° C. will control the local increases in temperature caused by self-heating while allowing the oxidation to proceed at a sufficiently high rate. The lower limit of temperature for heating is, for example, 100° C. The duration of heating is between 0.1 and 12 hours for example, and may be between 0.5 and 4 hours.

The regulation of oxygen partial pressure can be done with the use of oxygen gas or, alternatively, by using an oxygen source that is an oxidizing agent that releases oxygen at a predetermined temperature. Any kind of oxidizing agent can be used, including inorganic oxidizers such as $KMnO_4$. The degree of oxidation (e.g., the thickness of the oxide layer 11) can be controlled by modifying conditions such as the amount, position in the furnace, and loading of the oxidizing agent. For example, the proportion of oxygen in the electric furnace to the glass-ceramic sulfide solid electrolyte is adjusted to 0.1 cc/mg or less. This can prevent excessive oxidation.

Through these operations, an electrolyte material 10 is obtained.

Embodiment 2

In Embodiment 2, what is described in Embodiment 1 is not repeated unless necessary. A battery according to Embodiment 2 incorporates a sulfide solid electrolyte material described in Embodiment 1.

Figures 2, 3:
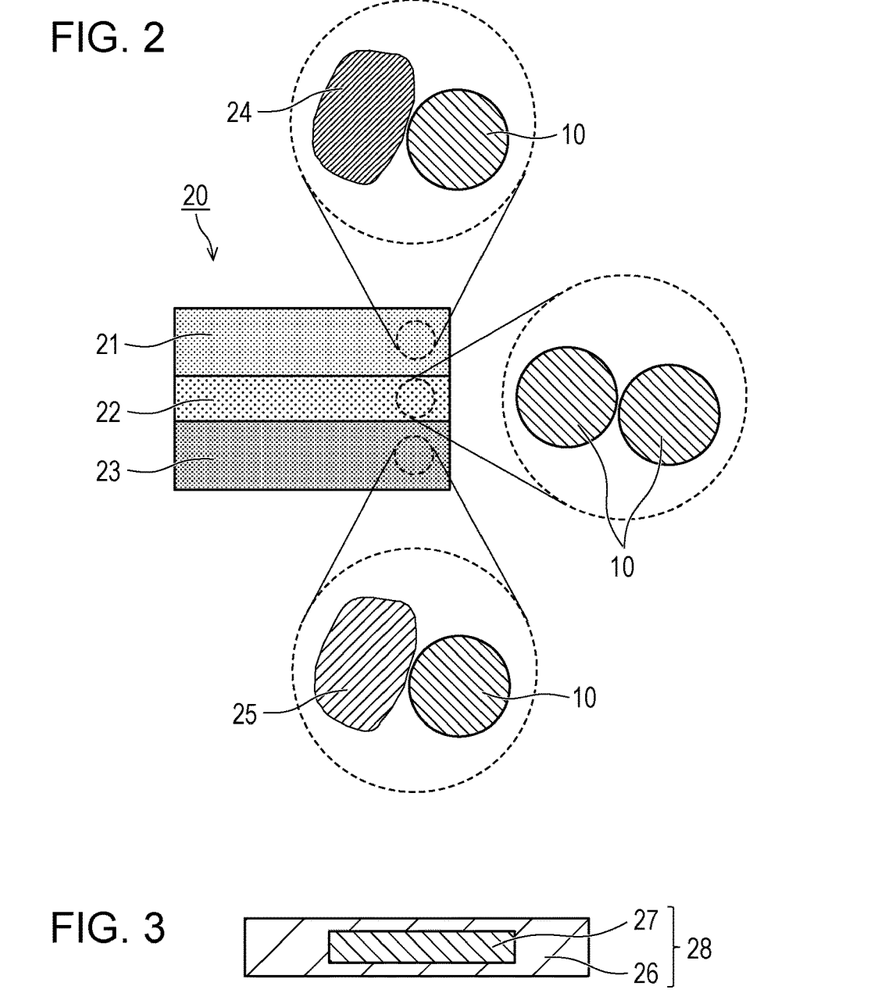
FIG. 2 is a schematic cross-sectional view of a battery according to Embodiment 2.
FIG. 3 is a schematic cross-sectional view of an electrolyte layer according to a variation.

As illustrated in FIG. 2, a battery 20 according to this embodiment includes a cathode 21, an anode 23, and an electrolyte layer 22. The cathode 21 contains a particulate cathode active material 24 and a sulfide solid electrolyte material 10. The electrolyte layer 22 is between the cathode 21 and the anode 23. The electrolyte layer 22 is in contact with both the cathode 21 and anode 23. The electrolyte layer 22 contains the sulfide solid electrolyte material 10. The anode 23 contains a particulate anode active material 25 and the sulfide solid electrolyte material 10. The battery 20 is, for example, an all-solid-state lithium secondary battery. A battery 20 according to this embodiment exhibits superior output characteristics by virtue of incorporating a sulfide solid electrolyte material 10 described in Embodiment 1. The battery 20 also has low hydrogen sulfide production.

In this embodiment, the sulfide solid electrolyte material 10 is contained in each of the cathode 21, anode 23, and electrolyte layer 22. It may be that at least the electrolyte layer 22 contains the sulfide solid electrolyte material 10 according to the present disclosure. The electrolyte layer 22 is the most electrolyte-rich of the cathode 21, anode 23, and electrolyte layer 22, which means that using a sulfide solid electrolyte material 10 according to the present disclosure in the electrolyte layer 22 is the most efficient way to reduce the hydrogen sulfide production of the battery 20. The advantage of reduced hydrogen sulfide production, however, is preserved as long as at least one selected from the group consisting of the cathode 21, anode 23, and electrolyte layer 22 contains the sulfide solid electrolyte material 10. Each of the cathode 21, anode 23, and electrolyte layer 22 may contain a sulfide solid electrolyte material other than the sulfide solid electrolyte material 10 according to the present disclosure.

The cathode 21 contains a material that stores and releases a metallic ion, such as the lithium ion. The cathode 21 contains, for example, a cathode active material (an example is the particulate cathode active material 24). The cathode 21 may contain the sulfide solid electrolyte material 10.

The cathode active material can be, for example, a lithium-containing transition metal oxide, a lithium-free transition metal oxide, a transition metal fluoride, a polyanionic compound, a fluorinated polyanionic compound, a transition metal sulfide, a transition metal oxyfluoride, a transition metal oxysulfide, and a transition metal oxynitride. In particular, a lithium-containing transition metal oxide, when used as the cathode active material, reduces the production costs of the battery 20 and increases the average discharge voltage of the battery 20.

The cathode 21 may contain at least one selected from $Li(NiCoAl)O_2$ and $LiCoO_2$ as cathode active material(s). These transition metal oxides can give the battery 20 a high energy density.

The median diameter of the particulate cathode active material 24 can be 0.1 µm or more and 100 µm or less. A particulate cathode active material 24 having an appropriate size is dispersed well together with the sulfide solid electrolyte material 10 in the cathode 21, giving the battery 20 superior discharge characteristics. A particulate cathode active material 24 having an appropriate size, moreover, is favorable for high-power operation of the battery 20 because such a material allows lithium ions to diffuse thereinto quickly. The median diameter of the particulate cathode active material 24 may be larger than that of particles of the sulfide solid electrolyte material 10. This leads to good dispersion of the particulate cathode active material 24 and sulfide solid electrolyte material 10.

In the cathode 21, the percentage of the volume of the particulate cathode active material 24 to the total volume of the particulate cathode active material 24 and sulfide solid electrolyte material 10, or percentage v, is, for example, 30% or more and 95% or less. The percentage of the volume of the sulfide solid electrolyte material 10 to the total volume of the particulate cathode active material 24 and sulfide solid electrolyte material 10, or (100−v), is, for example, 5% or more and 70% or less. A particulate cathode active material 24 and a sulfide solid electrolyte material 10 present in appropriate proportions give the battery 20 a sufficiently high energy density and enables high-power operation of the battery 20.

The thickness of the cathode 21 can be 10 µm or more and 500 µm or less. A cathode 21 having an appropriate thickness gives the battery 20 a sufficiently high energy density and enables high-power operation of the battery 20.

The electrolyte layer 22 contains a sulfide solid electrolyte material 10 according to the present disclosure. The electrolyte layer 22 may further contain a second sulfide solid electrolyte material different from the sulfide solid electrolyte material 10. The sulfide solid electrolyte material 10 and the second sulfide solid electrolyte material may be dispersed uniformly in the electrolyte layer 22. The second sulfide solid electrolyte material has, for example, a chemical composition different from that of the sulfide solid electrolyte material 10 and may have a structure different from that of the sulfide solid electrolyte material 10.

The thickness of the electrolyte layer 22 can be 1 µm or more and 500 µm or less. An electrolyte layer 22 having an appropriate thickness reliably prevents a short circuit between the cathode 21 and anode 23 and enables high-power operation of the battery 20.

Instead of the electrolyte layer 22, the battery 20 may have the electrolyte layer 28 illustrated in FIG. 3. The electrolyte layer 28 has a first electrolyte layer 26 and a second electrolyte layer 27. The second electrolyte layer 27 is covered with the first electrolyte layer 26. More specifically, the second electrolyte layer 27 is enveloped in the first electrolyte layer 26. The two primary surfaces of the electrolyte layer 28 are formed by the first electrolyte layer 26, although part of the second electrolyte layer 27 may be exposed on the surface of the electrolyte layer 28. The term "primary surface" means that the surface is the largest, in area, on the layer.

The first electrolyte layer 26 contains a sulfide solid electrolyte material 10 according to the present disclosure. The second electrolyte layer 27 may contain the sulfide solid electrolyte material 10, a second sulfide solid electrolyte material, or both. The first electrolyte layer 26 may contain a larger amount, on a mass basis, of the sulfide solid electrolyte material 10 than the second electrolyte layer 27.

In the electrolyte layer 28 in FIG. 3, the first electrolyte layer 26 extends around the second electrolyte layer 27, and the second electrolyte layer 27 is protected with the first electrolyte layer 26. The sulfide solid electrolyte material 10 in the first electrolyte layer 26 limits the penetration of water into the second electrolyte layer 27, reducing the production of hydrogen sulfide resulting from water penetration into the second electrolyte layer 27. The second electrolyte layer 27 can therefore be made of an electrolyte material that generates hydrogen sulfide more easily in exchange for higher ionic conductivity. This would further increase the ionic conductivity of the battery 20.

The anode 23 contains a material that stores and releases a metallic ion, such as the lithium ion. The anode 23 contains, for example, an anode active material (an example is the particulate anode active material 25). The anode 23 may contain the sulfide solid electrolyte material 10.

The anode active material can be, for example, a metallic material, carbon material, oxide, nitride, tin compound, or silicon compound. The metallic material can be a pure metal or alloy. Examples of metallic materials include metallic lithium and lithium alloys. Examples of carbon materials include natural graphite, coke, graphitizing carbon, carbon fiber, spherical carbon, artificial graphite, and amorphous carbon. It can be preferred, with the aim of achieving a higher capacity per unit volume, to use at least one selected from the group consisting of silicon (Si), tin (Sn), a silicon compound, and a tin compound as anode active material(s).

The median diameter of the particulate anode active material 25 can be 0.1 μm or more and 100 μm or less. A particulate anode active material 25 having an appropriate size is dispersed well together with a sulfide solid electrolyte material 10, giving the battery 20 superior discharge characteristics. A particulate anode active material 25 having an appropriate size, moreover, is favorable for high-power operation of the battery 20 because such a material allows lithium ions to diffuse thereinto quickly. The median diameter of the particulate anode active material 25 may be larger than that of particles of the sulfide solid electrolyte material 10. This leads to good dispersion of the particulate anode active material 25 and sulfide solid electrolyte material 10.

In the anode 23, the percentage of the volume of the particulate anode active material 25 to the total volume of the particulate anode active material 25 and sulfide solid electrolyte material 10, or percentage V, is, for example, 30% or more and 95% or less. The percentage of the volume of the sulfide solid electrolyte material 10 to the total volume of the particulate anode active material 25 and sulfide solid electrolyte material 10, or (100−V), is, for example, 5% or more and 70% or less. A particulate anode active material 25 and a sulfide solid electrolyte material 10 present in appropriate proportions give the battery 20 a sufficiently high energy density and enables high-power operation of the battery 20.

The thickness of the anode 23 can be 10 μm or more and 500 μm or less. An anode 23 having an appropriate thickness gives the battery 20 a sufficiently high energy density and enables high-power operation of the battery 20.

At least one selected from the cathode 21, anode 23, electrolyte layer 22, first electrolyte layer 26, and second electrolyte layer 27 may contain a second sulfide solid electrolyte material, different from the sulfide solid electrolyte material 10, added to increase ionic conductivity. The second sulfide solid electrolyte material can be, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ and may optionally contain an additive such as LiX (X: F, Cl, Br, or I), $Li_2O$, $MO_q$, or $Li_pMO_q$ (M: P, Si, Ge, B, Al, Ga, In, Fe, or Zn) (p, q: natural numbers).

At least one selected from the cathode 21, anode 23, electrolyte layer 22, first electrolyte layer 26, and second electrolyte layer 27 may contain an oxide solid electrolyte added to increase ionic conductivity. Examples of oxide solid electrolytes that can be used include NASICON solid electrolytes, represented by $LiTi_2(PO_4)_3$ and its substituted derivatives; (LaLi)$TiO_3$ perovskite solid electrolytes; LISICON solid electrolytes, represented by $Li_{14}ZnGe_4O_{16}$, $Li_4SiO_4$, $LiGeO_4$, and their substituted derivatives; garnet solid electrolytes, represented by $Li_7La_3Zr_2O_{12}$ and its substituted derivatives; $Li_3N$ and its H-substituted derivatives; and $Li_3PO_4$ and its N-substituted derivatives.

At least one selected from the cathode 21, anode 23, electrolyte layer 22, first electrolyte layer 26, and second electrolyte layer 27 may contain a halide solid electrolyte added to increase ionic conductivity. Examples of halide solid electrolytes that can be used include $Li_3InBr_6$, $Li_3InCl_6$, $Li_2FeCl_4$, $Li_2CrCl_4$, and $Li_3OCl$.

At least one selected from the cathode 21, anode 23, electrolyte layer 22, first electrolyte layer 26, and second electrolyte layer 27 may contain a complex hydride solid electrolyte added to increase ionic conductivity. Examples of complex hydride solid electrolytes that can be used include $LiBH_4$—LiI and $LiBH_4$—$P_2S_5$.

At least one selected from the cathode 21, anode 23, electrolyte layer 22, first electrolyte layer 26, and second electrolyte layer 27 may contain an organic polymer solid electrolyte added to increase ionic conductivity. The polymer solid electrolyte can be, for example, a compound of a polymer and a lithium salt, and the polymer may have the ethylene oxide structure. With a polymer having the ethylene oxide structure, the polymer solid electrolyte would give the electrode or layer containing it even higher ionic conductivity by virtue of the greater capacity of the polymer to accommodate lithium salt molecules. Examples of lithium salts that can be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone, or a mixture of two or more selected from these may be used.

At least one selected from the cathode 21, anode 23, electrolyte layer 22, first electrolyte layer 26, and second electrolyte layer 27 may contain a non-aqueous liquid electrolyte, gel electrolyte, or ionic liquid added to facilitate the exchange of lithium ions and thereby improve the output characteristics of the battery.

The non-aqueous liquid electrolyte contains a non-aqueous solvent and a lithium salt dissolved therein. The non-aqueous solvent can be, for example, a cyclic carbonate, linear carbonate, cyclic ether, linear ether, cyclic ester, linear ester, or fluorinated solvent. Examples of cyclic carbonate solvents include ethylene carbonate, propylene carbonate, and butylene carbonate. Examples of linear carbonate solvents include dimethyl carbonate, ethyl methyl carbonate, and diethyl carbonate. Examples of cyclic ether solvents include tetrahydrofuran, 1,4-dioxane, and 1,3-dioxolane. Examples of linear ether solvents include 1,2-dimethoxyethane and 1,2-diethoxyethane. Examples of cyclic ester solvents include γ-butyrolactone. Examples of linear ester solvents include methyl acetate. Examples of fluorinated solvents include fluoroethylene carbonate, methyl fluoropropionate, fluorobenzene, fluoromethyl methyl carbonate, and fluorodimethylene carbonate. One non-aqueous solvent selected from these may be used alone, or a mixture of two or more selected from these may be used.

The non-aqueous liquid electrolyte may contain at least one fluorinated solvent selected from the group consisting of fluoroethylene carbonate, methyl fluoropropionate, fluorobenzene, fluoromethyl methyl carbonate, and fluorodimethylene carbonate. Examples of lithium salts that can be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone, or a mixture of two or more selected from these may be used. The lithium salt concentration is, for example, between 0.5 to 2 mol/L.

The gel electrolyte can be a polymer material impregnated with a non-aqueous liquid electrolyte. Examples of polymer materials that can be used include polyethylene oxide, polyacrylonitrile, polyvinylidene fluoride, polymethyl methacrylate, and polymers having ethylene oxide bonds.

When an ionic liquid is used, the cation therein can be a quaternary cation with linear aliphatic chains, such as a tetraalkyl ammonium or tetraalkyl phosphonium; an ammonium with aliphatic ring(s), such as a pyrrolidinium, morpholinium, imidazolinium, tetrahydropyrimidinium, or piperidinium cation; or a nitrogen heteroaromatic cation, such as a pyridinium or imidazolium cation. The anion in the ionic liquid can be, for example, $PF_6^-$, $BF_4^-$, $SbF_6^-$, $AsF6^-$, $SO_3CF_3^-$, $N(SO_2CF_3)_2^-$, $N(SO_2C_2F_5)_2$, $N(SO_2CF_3)(SO_2C_4F_9)^-$, or $C(SO_2CF_3)_3^-$. The ionic liquid may contain a lithium salt.

At least one selected from the cathode 21, anode 23, electrolyte layer 22, first electrolyte layer 26, and second electrolyte layer 27 may contain a binder added to improve adhesion between particles. Examples of binders that can be used include polyvinylidene fluoride, polytetrafluoroethylene, polyethylene, polypropylene, aramid resin, polyamides, polyimides, polyimide-imides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyether sulfones, hexafluoropolypropylene, styrene butadiene rubber, and carboxymethyl cellulose. The binder can be a copolymer of two or more materials selected from tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these materials may also be used.

At least one selected from the cathode 21 and anode 23 may contain a conductive additive added to increase electronic conductivity.

Examples of conducive additives that can be used include graphite, such as natural and artificial graphite; carbon blacks, such as acetylene black and Ketjenblack; conductive fibers, such as carbon and metallic fibers; metallic powders, such as fluorinated carbon and aluminum powders; conductive whiskers, such as zinc oxide whiskers and potassium titanate whiskers; conductive metal oxides, such as titanium oxide; and conductive polymers, such as polyaniline, polypyrrole, and polythiophene.

The shape of the conductive additive is not critical. The conductive additive can be in the shape of, for example, needles, flakes, spheres, or ellipsoids. The conductive additive can be particles.

The particulate cathode active material 24 and particulate anode active material 25 may be coated with a coating material to have lower interfacial resistances. The coating material may cover part of the surface or the entire surface of the particulate cathode active material 24. Likewise, the coating material may cover part of the surface or the entire surface of the particulate anode active material 25.

The coating material can be, for example, a solid electrolyte, such as a sulfide, oxide, halide, polymer, or complex hydride solid electrolyte. The coating material can be an oxide solid electrolyte. Oxide solid electrolytes exhibit superior stability at high potentials. The use of an oxide solid electrolyte as the coating material improves the charge and discharge efficiency of the battery 20.

Examples of oxide solid electrolytes that can be used as the coating material include Li—Nb—O compounds, such as $LiNbO_3$; Li—B—O compounds, such as $LiBO_2$ and $Li_3BO_3$; Li—Al—O compounds, such as $LiAlO_2$; Li—Si—O compounds, such as $Li_4SiO_4$; Li—Ti—O compounds, such as $Li_2SO_4$ and $Li_4Ti_5O_{12}$; Li—Zr—O compounds, such as $Li_2ZrO_3$; Li—Mo—O compounds, such as $Li_2MoO_3$; Li—V—O compounds, such as $LiV_2O_5$; and Li—W—O compounds, such as $Li_2WO_4$.

EXAMPLES

Comparative Example 1

In a glove box filled with an Ar gas with a dew point of −60° C. or lower, some amounts of $Li_2S$, $P_2S_5$, and LiI powders were weighed out so that the molar ratio $Li_2S:P_2S_5$:LiI would be 60:20:20, and the powders taken were mixed and ground in a mortar. The mixture was milled using a planetary ball mill at a rotation speed of 510 rpm for 10 hours. The resulting vitreous solid electrolyte was heated at 230° C. for 2 hours in an inert atmosphere. This gave a glass-ceramic sulfide solid electrolyte material of Comparative Example 1.

Comparative Example 2

A sulfide solid electrolyte material of Comparative Example 2 was obtained in the same way as in Comparative Example 1, except that the heating temperature was 280° C.

Comparative Example 3

In a glove box filled with an Ar gas with a dew point of −60° C. or lower, some amounts of $Li_2S$ and $P_2S_5$ powders were weighed out so that the molar ratio $Li_2S:P_2S_5$ would be 75:25, and the powders taken were mixed and ground in a mortar. The mixture was milled using a planetary ball mill at a rotation speed of 510 rpm for 10 hours. The resulting vitreous solid electrolyte was heated at 270° C. for 2 hours in an inert atmosphere. This gave a $Li_2S$—$P_2S_5$ powder as a glass-ceramic sulfide solid electrolyte material of Comparative Example 3.

Comparative Example 4

In a glove box filled with an Ar gas with a dew point of −60° C. or lower, 500 mg of the glass-ceramic sulfide solid electrolyte material prepared in Comparative Example 1 ($Li_2S$—$P_2S_5$—LiI; $Li_2S:P_2S_5$:LiI=60:20:20) was put into a sealable container. After the container was sealed and evacuated, 17.5 cc of oxygen gas was introduced into the container. The container was then placed in an electric furnace, and the sulfide solid electrolyte material was heated at 230° C. for 450 seconds. This gave a sulfide solid electrolyte material of Comparative Example 4. The sulfide solid electrolyte material of Comparative Example 4 had an oxide layer.

Comparative Example 5

In a glove box filled with an Ar gas with a dew point of −60° C. or lower, 500 mg of the glass-ceramic sulfide solid electrolyte material prepared in Comparative Example 3 ($Li_2S$—$P_2S_5$; $Li_2S:P_2S_5$=75:25) was put into a sealable container. After the container was sealed and evacuated, 28.0 cc of oxygen gas was introduced into the container. The container was then placed in an electric furnace, and the sulfide solid electrolyte material was heated at 300° C. for 2400 seconds. This gave a sulfide solid electrolyte material of Comparative Example 5. The sulfide solid electrolyte material of Comparative Example 5 had an oxide layer.

Example 1

In a glove box filled with an Ar gas with a dew point of −60° C. or lower, 500 mg of the glass-ceramic sulfide solid electrolyte material prepared in Comparative Example 1 ($Li_2S$—$P_2S_5$—LiI; $Li_2S$:$P_2S_5$:LiI=60:20:20) was put into a sealable container. After the container was sealed and evacuated, 17.5 cc of oxygen gas was introduced into the container. The container was then placed in an electric furnace, and the sulfide solid electrolyte material was heated at 210° C. for 5000 seconds. This gave a sulfide solid electrolyte material of Example 1. The sulfide solid electrolyte material of Example 1 had an oxide layer. $^{31}$P-NMR measurement The sulfide solid electrolyte materials of Example 1 and Comparative Examples 1, 2, and 4 were analyzed by $^{31}$P-NMR under the following conditions. Ammonium phosphate was used as the chemical shift reference at 0 ppm.

Sample spinning frequency: 20 kHz
The number of scans: 32
Relaxation time: 30 seconds
Measurement of Ionic Conductivity The ionic conductivity of the sulfide solid electrolyte materials of Example 1 and Comparative Examples 1 to 5 was measured as follows.

In an insulating cylinder, 80 mg of the sulfide solid electrolyte material was pressed into a layer at a pressure of 360 MPa. The thickness of the resulting electrolyte layer was measured using calipers. Metallic In foil (200-μm thick) was placed on the top and bottom surfaces of the electrolyte layer, and the layers of foil and the electrolyte layer were pressed together with a pressure of 80 MPa to give a laminate of metallic In foil, an electrolyte layer, and metallic In foil. A stainless steel current collector was placed on the top and bottom surfaces of the laminate, and a lead for current collection was attached to each current collector. Lastly, the insulating cylinder was sealed with an insulating ferrule to prevent the inside of the cylinder from being exposed to the external air. In this way, an electrochemical cell for the measurement of ionic conductivity was prepared.

This electrochemical cell was placed in a thermostatic chamber at 25° C. The resistance was measured by the AC impedance method with voltage swings of ±10 mV over the frequency range of 0.01 Hz to 1 MHz. From the measured resistance, the area of the electrodes, and the thickness of the electrolyte layer, the ionic conductivity was calculated.
Measurement of Hydrogen Sulfide Production The hydrogen sulfide production of the sulfide solid electrolyte materials of Example 1 and Comparative Examples 1 to 5 was measured as follows.

In a glove box filled with an Ar gas with a dew point of −60° C. or lower, 80 mg was weighed out of the sulfide solid electrolyte material. The material was transferred into a powder compaction die with an inner diameter of 9.5 mm and pressed into a pellet at a pressure of 360 MPa. The pellet was removed from the die and placed in a sealable glass container. The glass container was placed in a humidified thermostatic chamber at a temperature of 25° C. and 50% RH, and the inside was purged with a humid atmosphere. The glass container was then sealed to expose the pellet to the humid atmosphere for 60 minutes. At 60 minutes after sealing, the amount of hydrogen sulfide in the container was measured using a portable gas monitor (Riken Keiki GX-2012). Hydrogen sulfide production per unit weight ($cm^3$/g) was derived by dividing the amount of hydrogen sulfide by the weight of the pellet.
XPS Measurement The sulfide solid electrolyte material of Example was subjected to XPS under the following conditions. Sputtering of the sulfide solid electrolyte material with the C60 cluster ion and XPS measurement were alternated. That is, XPS depth analysis was performed under the conditions given below. In the four spectra obtained, the peak areas were calculated. The oxygen content (atom %) of the sulfide solid electrolyte material was determined from the proportion of the peak area for oxygen (O) to the total peak areas for oxygen (O), lithium (Li), phosphorus (P), and sulfur (S).

Measuring instrument: PHI VersaProbe
X-ray source: Monochromatic Al Kα radiation (1486.6 eV)
Spectra measured: O1s, Li1s, P2p, and S2p
Sputtering conditions: C60+ and 10.0 kV
Sputtering rate: Approximately 2 nm/min (on a $SiO_2$ basis)

Figure 4:
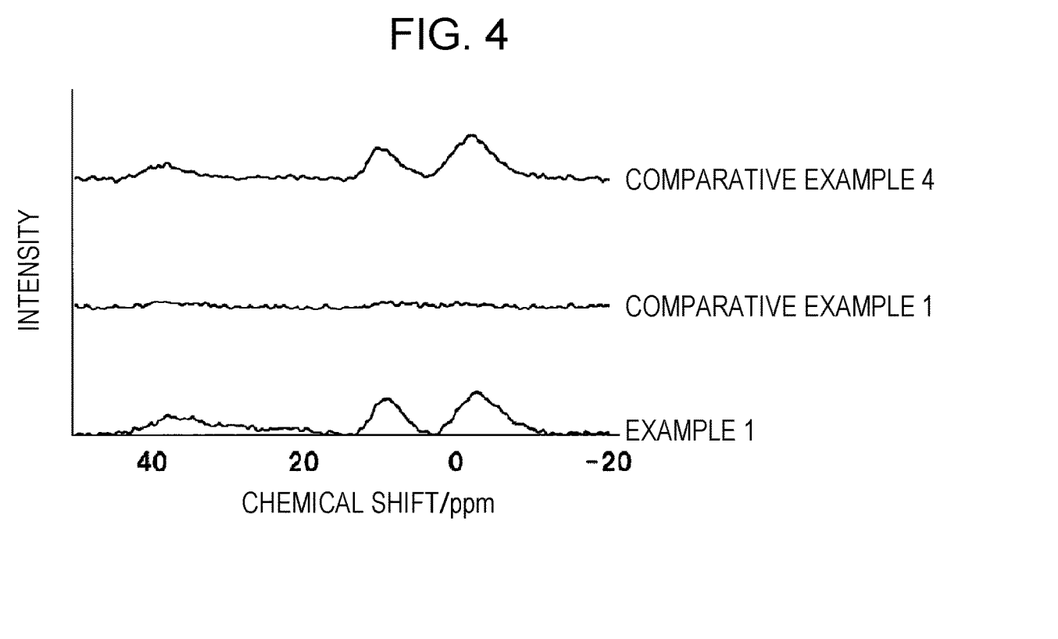
FIG. 4 is a graph that presents $^{31}$P-NMR results for the sulfide solid electrolyte materials of Example 1, Comparative Example 1, and Comparative Example 4.

FIG. 4 is a graph that presents $^{31}$P-NMR results for the sulfide solid electrolyte materials of Example 1, Comparative Example 1, and Comparative Example 4. The spectrum from Comparative Example 1 had no peak in the range of −20 to 50 ppm. The spectra from Comparative Example 4 and Example 1 had peaks near 38 ppm and near 10 ppm. The peaks near 38 ppm and near 10 ppm correspond respectively to the structures of $PSO_3^{3-}$ and $PO_4^{3-}$, which means that Comparative Example 4 and Example 1 had an oxide layer that contained at least the structures of $PSO_3^{3-}$ and $PO_4^{3-}$. Comparative Example 1 had no oxide layer.

Figure 5:
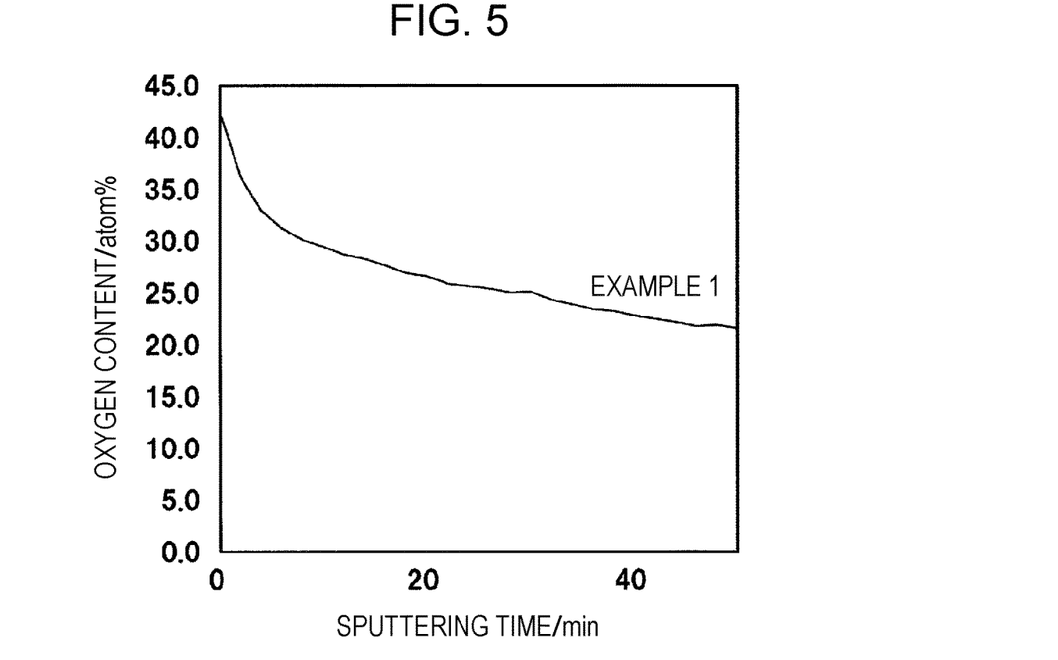
FIG. 5 is a graph that presents XPS results for the sulfide solid electrolyte material of Example 1.

FIG. 5 is a graph that presents XPS results, specifically the relationship between sputtering time and oxygen content, for the sulfide solid electrolyte material of Example 1. The oxygen content gradually decreased from the surface to the inside of the sulfide solid electrolyte material, higher in the region of shorter sputtering time, or the region closer to the surface of the electrolyte material, and lower in the region of longer sputtering time, or the inner region of the electrolyte material. As confirmed by the results in FIG. 5, the sulfide solid electrolyte material of Example 1 had an oxide layer in its superficial portion.

Figure 6:
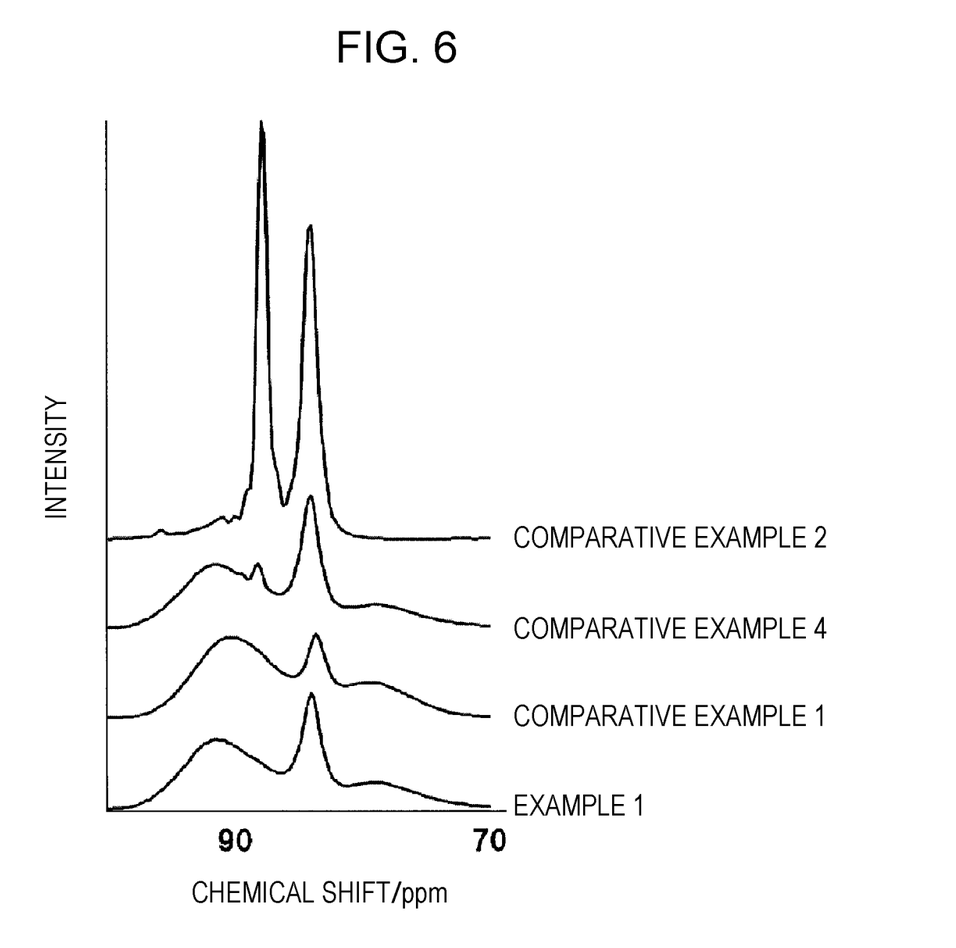
FIG. 6 is a graph that presents $^{31}$P-NMR results for the sulfide solid electrolyte materials of Example 1 and Comparative Examples 1, 2, and 4.

FIG. 6 is a graph that presents $^{31}$P-NMR results for the sulfide solid electrolyte materials of Example 1 and Comparative Examples 1, 2, and 4. The spectra from Comparative Examples 2 and 4 exhibited peaks near 88 ppm and near 84 ppm. In the spectra from Comparative Example 1 and Example 1, the peak near 84 ppm was noticeable but that near 88 ppm was not.

Table 1 presents the ionic conductivity and hydrogen sulfide production of the sulfide solid electrolyte materials of Example 1 and Comparative Examples 1 to 5. For the sulfide solid electrolyte materials of Example 1 and Comparative Examples 1, 2, and 4, the ratio of intensity between peaks (Za/Zb) was calculated from the $^{31}$P-NMR results, and these ratios are also given in Table 1.

The intensity Za is that of the first peak component, which appeared near 88 ppm, and the intensity Zb is that of the second peak component, which appeared near 84 ppm.

The intensities of peaks were calculated as follows, by the Gaussian fitting of the spectrum. Even if the peak near 88 ppm was substantially unnoticeable as in the spectra from Example 1 and Comparative Example 1, spectral fitting was performed assuming that there was a first peak component near 88 ppm. Instead of the intensities of peaks in the actual spectrum, those in the fitting curve could be used as the intensities Za and Zb.

Specifically, the positions of the first peak component in Comparative Examples 1, 2, and 4 and Example 1 were set to 88.0 ppm, 87.9 ppm, 88.1 ppm, and 88.0 ppm, respectively. The positions of the second peak component in Comparative Examples 1, 2, and 4 and Example 1 were set to 83.7 ppm, 84.2 ppm, 84.0 ppm, and 84.1 ppm, respectively.

The fitting in Example 1 and Comparative Example 1 considered peak components near 92 ppm and near 78 ppm besides the first and second peak components.

TABLE 1

|  | Ionic conductivity (S/cm) | Hydrogen sulfide production (cm$^3$/g) | Za/Zb |
| --- | --- | --- | --- |
| Comparative Example 1 | $2.5 \times 10^{-3}$ | $2.3 \times 10^{-2}$ | 0.90 |
| Comparative Example 2 | $1.6 \times 10^{-4}$ | $6.3 \times 10^{-2}$ | 1.33 |
| Comparative Example 3 | $6.8 \times 10^{-4}$ | $4.2 \times 10^{-2}$ | — |
| Comparative Example 4 | $9.3 \times 10^{-4}$ | $4.9 \times 10^{-2}$ | 0.49 |
| Comparative Example 5 | $1.3 \times 10^{-4}$ | $3.5 \times 10^{-2}$ | — |
| Example 1 | $1.1 \times 10^{-3}$ | $7.3 \times 10^{-3}$ | 0.42 |

In Comparative Examples 3 and 5, in which no halogen was included the constituents of the electrolyte material, the ionic conductivity was as low as below $1 \times 10^{-3}$ S/cm, and the hydrogen sulfide production was higher than $1 \times 10^{-2}$ cm$^3$/g. The electrolyte material of Comparative Example 5, having an oxide layer, produced less hydrogen sulfide than that of Comparative Example 5, having no oxide layer. Without a halogen in the solid electrolyte material, heating the electrolyte material to form an oxide layer thereon, even at a temperature as high as 300° C., scarcely changes the crystallographic structure of the sulfide material. The crystal phase that gives a peak near 88 ppm separates out only in a limited amount, resulting in high ionic conductivity and low hydrogen sulfide production of the solid electrolyte material. Moreover, the oxide layer prevents moisture from reaching the sulfide layer, further reducing the hydrogen sulfide production.

In Comparative Example 1, the electrolyte material was primarily a structure that exhibits the second peak component, near 84 ppm. The ionic conductivity was high, and the hydrogen sulfide production was relatively low. However, a hydrogen sulfide production exceeding $1 \times 10^{-2}$ cm$^3$/g is not sufficiently low.

In Comparative Example 2, the electrolyte material contained both of the structure that exhibits the first peak component, near 88 ppm, and the structure that exhibits the second peak component, near 84 ppm. The ionic conductivity was low, and the hydrogen sulfide production was high.

In Comparative Example 4, the electrolyte material had an oxide layer. Since the oxidation in the production process was at 230° C., the electrolyte material of Comparative Example 4 had a structure that exhibits the first peak component, near 88 ppm. As a result, the ionic conductivity was low, and the hydrogen sulfide production was high.

In Example 1, the oxidation in the process of producing the electrolyte material was at 210° C., hence the structure that exhibits the first peak component, near 88 ppm, was scarce. The ratio of the intensity Za of the first peak component, near 88 ppm, to the intensity Zb of the second peak component, near 84 ppm, was 0.42 (Za/Zb). By virtue of this, the electrolyte material of Example 1 exhibited a high ionic conductivity exceeding $1 \times 10^{-3}$ S/cm and a low hydrogen sulfide production falling below $1 \times 10^{-2}$ cm$^3$/g. In the present disclosure, the ionic conductivity of the sulfide solid electrolyte material is, for example, $1 \times 10^{-3}$ S/cm or more. There is no upper limit to the ionic conductivity. Higher ionic conductivities are more desirable.

There is no particular lower limit to the ratio of intensity between peaks (Za/Zb). Theoretically, the lower limit of the ratio (Za/Zb) is zero.

Overall, forming an oxide layer can reduce hydrogen sulfide production. When an oxide layer is formed on the surface of a sulfide solid electrolyte material containing LiX, self-heating associated with oxidation can cause a change in crystallographic structure. According to the techniques disclosed here, such a change in crystallographic structure is controlled by forming the oxide layer through heating at a sufficiently low temperature. The resulting sulfide solid electrolyte material therefore has low hydrogen sulfide production.

What is claimed is:

1. A sulfide solid electrolyte material comprising:
a sulfide particle containing a sulfide that contains lithium, phosphorus, a halogen and sulfur; and
an oxide layer covering a surface of the sulfide particle, the oxide layer containing an oxide that contains lithium, phosphorus, the halogen and oxygen, wherein
in a $^{31}$P-NMR spectrum of the sulfide solid electrolyte material, a first peak component, which is defined within a first chemical shift range from 87.6 to 88.4 ppm, has an intensity equal to or less than 0.42 times intensity of a second peak component, which is defined within a second chemical shift range from 83.6 to 84.4 ppm.

2. The sulfide solid electrolyte material according to claim 1, wherein
the oxide has a same structure as the sulfide, except that the sulfur in the sulfide has been at least partially substituted with the oxygen.

3. The sulfide solid electrolyte material according to claim 1, wherein
the oxide contains the oxygen and all elements constituting the sulfide.

4. The sulfide solid electrolyte material according to claim 1, wherein
the halogen is iodine.

5. The sulfide solid electrolyte material according to claim 1, wherein
the sulfide contains Li$_2$S—P$_2$S$_5$—LiX, where X denotes the halogen.

6. The sulfide solid electrolyte material according to claim 5, wherein
the X is I.

7. A battery comprising:
a cathode;
an anode; and
an electrolyte layer between the cathode and the anode, wherein
at least one selected from the group consisting of the cathode, anode, and electrolyte layer contains the sulfide solid electrolyte material according to claim 1.

8. The sulfide solid electrolyte material according to claim 1, wherein an oxygen content gradually decreases from the surface of the sulfide particle to an inside of the sulfide particles.

9. A sulfide solid electrolyte material comprising:
a plurality of sulfide bodies each containing a sulfide that contains lithium, phosphorus, a halogen, and sulfur, and having a shape of a needle, a flake, a sphere, or an ellipsoid; and
an oxide layer covering a surface of each of the plurality of sulfide bodies, the oxide layer containing an oxide that contains lithium, phosphorus, the halogen, and oxygen.

10. The sulfide solid electrolyte material of claim 9, wherein
in a $^{31}$P-NMR spectrum of the sulfide solid electrolyte material, a first peak component, which is defined within a first chemical shift range from 87.6 to 88.4 ppm, has an intensity equal to or less than 0.42 times intensity of a second peak component, which is defined within a second chemical shift range from 83.6 to 84.4 ppm.

* * * * *